A. D. CLARK.

Saw-Mills.

No. 133,630.  Patented Dec. 3, 1872.

Witnesses

Inventor

UNITED STATES PATENT OFFICE.

ALFRED D. CLARK, OF HILLSBOROUGH, OHIO, ASSIGNOR OF ONE-HALF HIS RIGHT TO NATHAN SPEER, OF SAME PLACE.

IMPROVEMENT IN SAW-MILLS.

Specification forming part of Letters Patent No. 133,630, dated December 3, 1872.

*To all whom it may concern:*

Be it known that I, A. D. CLARK, of Hillsborough, Highland county, Ohio, have invented certain Improvements in Muley-Saw Mills, of which the following is a specification:

The first part of my invention relates to the use of a flanged arbor in a muley saw, and lengthening of the arbor to form journals working in the slide-blocks on each side. The second part of my invention relates to the extension of the flanges of the lower arbor downward, thus forming the ears of the pitman-wrist, and making a substantial, simple, and steadier running attachment for the purpose named.

Figure 1:
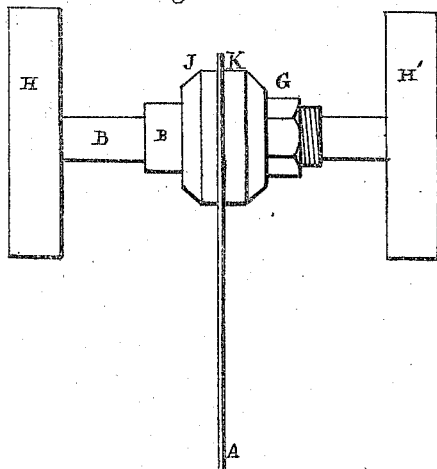
Figure 2:
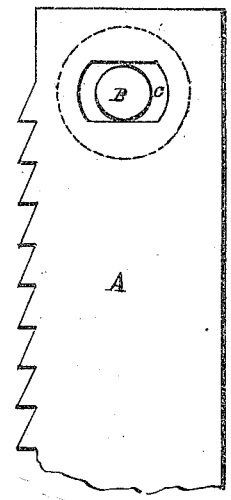
Figure 2:
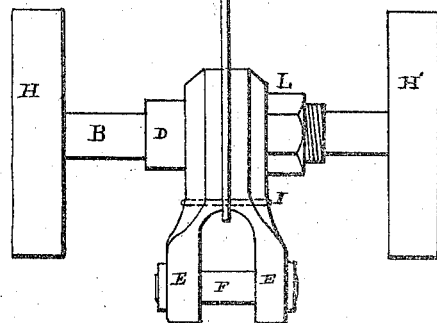

Figure 1 is a front elevation. Fig. 2 is a section, showing inside of upper arbor.

A is the saw. B is the upper arbor, and C the slot in the saw, by means of which the rake is changed. D is the lower arbor, which is lengthened downward to form the ears of wrist E. F is the spindle of wrist. H H' are the slide-blocks. I is bolt to prevent turning of lower flanges.

The object of my invention is, first, to regulate the variation of the rake. I provide an arbor, B, having flanges, between which the saw A is clamped by nuts G. The saw is slotted transversely, and moves on arbor B. To give greater rake for soft lumber, or rapid sawing, the saw is shifted forward. For fine sawing or hard lumber the saw is set back, the adjustment being almost instantaneous. Again, to make the saw run steadier and smoother, and to make the attachment more substantial and cheaper, I place my wrist in a direct line with the saw, and make the flanges by which the saw is secured and the ears of the pitman-wrist in one piece—*i. e.*, one for each side. By this arrangement, and the extension of the arbors sufficiently to form journals connecting with slide-blocks H H', the saw oscillates sufficiently when changing the rake to prevent any disturbance of the alignment.

Claims.

1. A cross-head for a muley saw, consisting of the slides H H', transverse rod B provided with stationary cheek I and adjustable cheek K, and nut G, substantially as and for the purpose specified.

2. A cross-head with pitman-connection, consisting of the slides H H', transverse rod D provided with nut L, combined with the adjustable wrist, consisting of the two side pieces E E, rod I, and bolt F, substantially as and for the purpose specified.

ALFRED DEARING CLARK.

Witnesses:
HENRY L. MEEK,
CHAS. M. O'HARA.